United States Patent
Chen et al.

(10) Patent No.: US 12,505,169 B2
(45) Date of Patent: Dec. 23, 2025

(54) SYSTEM AND METHOD FOR OPTIMIZING CONTENT TO IMPROVE SEARCH RESULTS OF A NATURAL LANGUAGE INTERACTION APPLICATION

(71) Applicant: ProphetStor Data Services, Inc., Taichung (TW)

(72) Inventors: Wen-Shyen Chen, Taichung (TW); Yu-Ju Chen, Taichung (TW); Jonathan Chen, Taichung (TW)

(73) Assignee: ProphetStor Data Services, Inc., Taichung (TW)

( * ) Notice: Subject to any disclaimer, the term of this patent is extended or adjusted under 35 U.S.C. 154(b) by 0 days.

(21) Appl. No.: 18/127,901

(22) Filed: Mar. 29, 2023

(65) Prior Publication Data

US 2024/0330378 A1    Oct. 3, 2024

(51) Int. Cl.
  *G06F 16/9535*  (2019.01)
  *G06F 16/906*  (2019.01)
  *G06F 16/9538*  (2019.01)

(52) U.S. Cl.
  CPC ........ *G06F 16/9535* (2019.01); *G06F 16/906* (2019.01); *G06F 16/9538* (2019.01)

(58) Field of Classification Search
  CPC . G06F 16/9535; G06F 16/906; G06F 16/9538
  See application file for complete search history.

(56) References Cited

U.S. PATENT DOCUMENTS

| 2010/0332583 | A1* | 12/2010 | Szabo | G06F 16/2457 |
| | | | | 709/217 |
| 2011/0191372 | A1* | 8/2011 | Kaushansky | G06F 16/9535 |
| | | | | 707/E17.014 |
| 2023/0281258 | A1* | 9/2023 | Serletic, II | G06F 16/953 |
| | | | | 707/706 |

FOREIGN PATENT DOCUMENTS

| CN | 113711207 | 11/2021 |
| TW | 202014916 | 4/2020 |

OTHER PUBLICATIONS

TW OA from TW11221310160, mailed Dec. 29, 2023.
TW Search Report from TW11221310160, mailed Dec. 29, 2023.

* cited by examiner

*Primary Examiner* — Tyler J Torgrimson
(74) *Attorney, Agent, or Firm* — Demian K. Jackson; Jackson IPG PLLC

(57) ABSTRACT

The present invention provides a system and method for optimizing content to improve search results of a natural language interaction application such as ChatGPT. The method includes processing user data using natural language techniques to identify user intent, sentiment, and other relevant information. The system generates a dynamic response tailored to the specific user and context based on the user's intent, personal profile, and contextual information. The present invention provides a unique approach to optimize content for ChatGPT-based search engines, leading to higher search rankings and increased user engagement. The system also includes local engines that interact with ChatGPT to ensure the accuracy of their classification functions, such as sentiment analysis and tone detection, and machine learning algorithms to improve the system's performance continuously.

18 Claims, 5 Drawing Sheets

SYSTEM AND METHOD FOR OPTIMIZING CONTENT TO IMPROVE SEARCH RESULTS OF A NATURAL LANGUAGE INTERACTION APPLICATION

FIELD OF THE INVENTION

The present invention relates to a system and method for optimizing content to improve search results. More particularly, the present invention relates to a system and method for optimizing content to improve search results of a natural language interaction application.

BACKGROUND OF THE INVENTION

Search Engine Optimization (SEO) refers to the practice of optimizing websites and web pages to rank higher in search engine results pages (SERPs) for specific keywords and phrases. The goal of SEO is to increase the visibility and organic traffic of a website, which can lead to more conversions, sales, and revenue.

There are several techniques used in SEO, including keyword research, on-page optimization (such as optimizing the content, title tags, meta descriptions, and URLs), link building, and technical SEO (such as improving website speed, mobile responsiveness, and site architecture). While SEO can be highly effective in driving traffic and improving website rankings, there are also some potential drawbacks to consider. These include:

1. SEO is a long-term strategy: SEO takes time to produce results, and it can take several months or even years to see significant improvements in rankings and traffic.
2. SEO is constantly evolving: Search engine algorithms are constantly changing, and what works today may not work tomorrow. This means that SEO requires ongoing monitoring and adaptation to stay effective.
3. SEO can be competitive: Depending on your industry and niche, there may be many other websites competing for the same keywords and rankings, making it difficult to achieve and maintain top positions.
4. SEO can be expensive: Depending on the level of competition in your industry and the scope of your SEO campaign, SEO can be a significant investment, and it may require ongoing expenses for tools, content creation, and link building.
5. SEO results are not guaranteed: While SEO can be highly effective, there are no guarantees of success. Search engine algorithms are complex and can be unpredictable, and there are many factors that can influence rankings and traffic.

Traditional SEO techniques, merely focus on optimizing content for relevant keywords and increasing link popularity, the unique characteristics (e.g., natural language processing and sentiment analysis) of natural language interaction applications such as Apple's Siri, Amazon's Alexa, Google's BERT, and OpenAI's ChatGPT are not put into consideration.

The present invention is a significant advancement in search engine optimization, providing a new approach to optimizing content for natural language interaction applications such as ChatGPT-based search engines which utilize natural language processing and sentiment analysis. In other words, the present invention differs from traditional SEO techniques by offering a tailored method for optimizing content designed explicitly for ChatGPT-based search engines.

The present invention also provides a more personalized experience for users, as it considers the user's intent, personal profile, and contextual information to generate a dynamic response tailored to the specific user and context. This personalized approach to search engine optimization has been shown to improve user engagement and increase the likelihood of users returning to the site in the future.

The innovative aspects of the present invention lie in its use of natural language processing techniques and sentiment analysis, as well as the generation of dynamic responses, to optimize content for ChatGPT-based search engines. These techniques provide a unique approach to search engine optimization specifically tailored to the needs of ChatGPT-based search engines and have not been utilized in the past. The present invention represents a significant advance in search engine optimization, providing a more effective and efficient way to optimize content for ChatGPT-based search engines.

SUMMARY OF THE INVENTION

This paragraph extracts and compiles some features of the present invention; other features will be disclosed in the follow-up paragraphs. It is intended to cover various modifications and similar arrangements included within the spirit and scope of the appended claims. The following presents a simplified summary of one or more aspects of the present disclosure to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

The present invention provides a system and method for optimizing content to improve search results of a natural language interaction application such as Apple's Siri, Amazon's Alexa, Google's BERT, and OpenAI's ChatGPT so that the content can be more easily recognized and picked up by the natural language interaction application, leading to higher search rankings and increased user engagement.

In one aspect, the present invention provides a method for optimizing content to improve search results of a natural language interaction application including the following steps: analyzing input data received from a user; determining search intent and sentiment of the user based on the input data; selecting content relevant to the search intent and sentiment of the user from a database of content; identifying critical keywords and phrases related to a specific category of users and/or context; incorporating the identified critical keywords and phrases into the selected content; generating an optimized content tailored to the user and context; verifying whether the optimized content is aimed at the specific category of users by the natural language interaction application; and updating the classification of the optimized content in the database according to the verification result.

Preferably, further comprising a step of: predicting interest and/or preference of the user based on demographic data and/or social media interactions.

Preferably, the selected content is relevant to the predicted interest and/or preference of the user.

Preferably, the selected content is based on search history of the user.

Preferably, further comprising a step of: revising the selected content by using positive language and addressing common pain points and objections.

Preferably, the search intent, sentiment, critical keywords and phrases are determined and identified using natural language processing techniques and machine learning algorithms.

Preferably, the optimized content is based on the search intent, personal profile, and contextual information.

Preferably, the personal profile is obtained via chat logs, weblogs, social media, and surveys.

Preferably, further comprising a step of: monitoring the search engine ranking of the optimized content and adjusting the optimization strategy accordingly.

Preferably, further comprising a step of: tracking user behavior and feedback to improve the search results and overall user experience.

In another aspect, the present invention provides a system for optimizing content to improve search results of a natural language interaction application which includes: a storage unit, having a database of contents classified in different categories; a processing unit, for analyzing input data received from a user, determining search intent and sentiment of the user based on the input data, and identifying critical keywords and phrases related to a specific category of users and/or context; a selecting unit, connected to the storage unit and the processing unit, for selecting content relevant to the search intent and sentiment of the user from the database in the storage unit; an optimization unit, connected to the selecting unit, for incorporating the identified critical keywords and phrases into the selected content, and generating an optimized content tailored to the user and context; and a verification unit, connected to the optimization unit, for providing the optimized content to the natural language interaction application to verify whether the optimized content is aimed at the specific category of users by the natural language interaction application, and updating the classification of the optimized content in the database according to the verification result.

Preferably, the processing unit further predicts interest and/or preference of the user based on demographic data and/or social media interactions.

Preferably, the selected content is relevant to the predicted interest and/or preference of the user.

Preferably, the selected content is based on search history of the user.

Preferably, the selected content is revised by the optimization unit by using positive language and addressing common pain points and objections.

Preferably, the search intent, sentiment, critical keywords and phrases are determined and identified using natural language processing techniques and machine learning algorithms by the processing unit.

Preferably, the optimized content is based on the search intent, personal profile, and contextual information.

Preferably, the personal profile is obtained via chat logs, weblogs, social media, and surveys.

Preferably, further comprising a monitoring unit, for monitoring the search engine ranking of the optimized content and sending feedback to the processing unit to adjust the optimization strategy accordingly.

Preferably, the monitoring unit tracks user behavior and sends feedback to the processing unit to improve the search results and overall user experience.

DETAILED DESCRIPTION OF THE PREFERRED EMBODIMENTS

The present invention will now be described more specifically with reference to the following embodiments. The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form to avoid obscuring such concepts.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation.

The present invention provides a system and method for optimizing content to improve search results of a natural language interaction application so that the content can be more easily recognized and picked up by the natural language interaction application, leading to higher search rankings and increased user engagement. Natural language interaction application is a software application that uses natural language to interact with a human user. It performs functions similar to those provided by human assistants, in that they can engage in conversations with their users in order to for example provide information, carry out routine tasks, or perform other operations as required. Examples of natural language interaction application includes Apple's Siri, Amazon's Alexa, Google's BERT, and OpenAI's ChatGPT.

Figure 1:
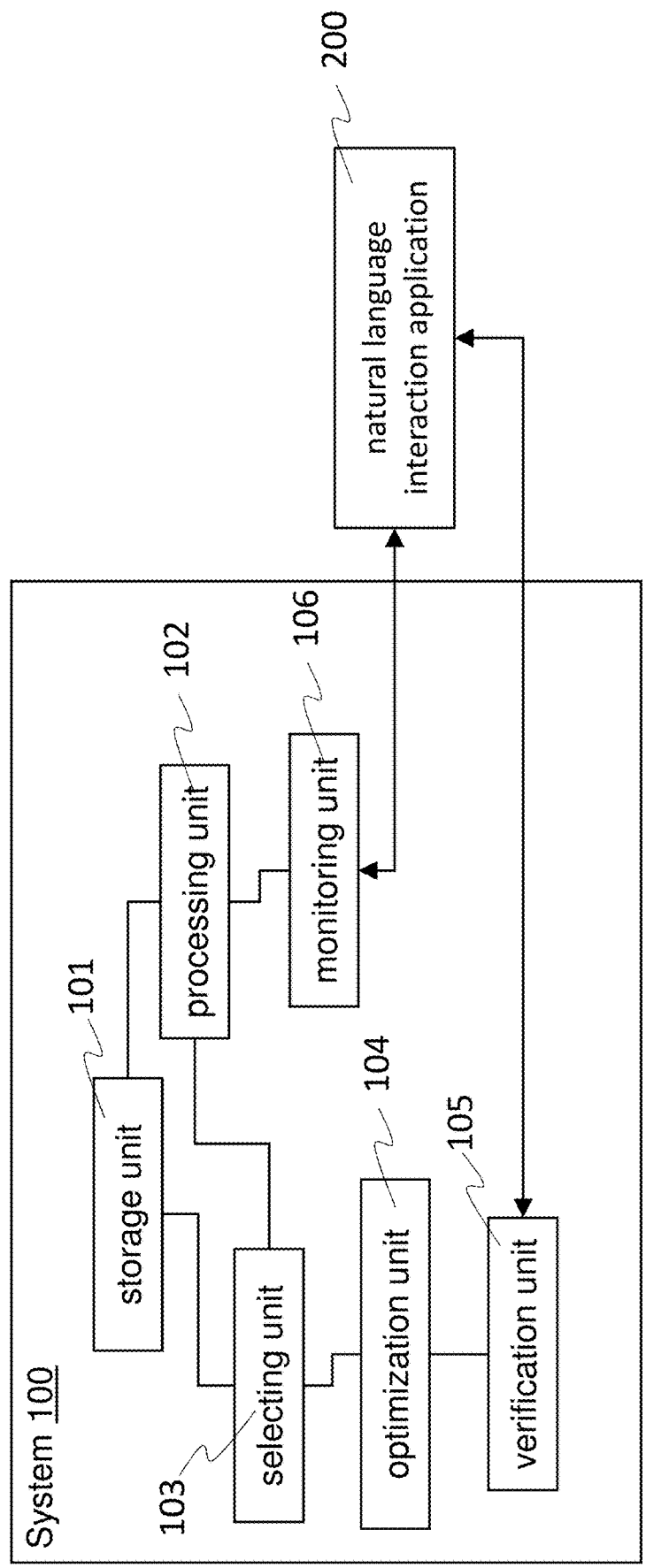
FIG. 1 is a block diagram illustrating major components of a system for optimizing content to improve search results of a natural language interaction application according to an embodiment of the present invention.

FIG. 1 is a block diagram illustrating major components of a system 100 for optimizing content to improve search results of a natural language interaction application 200 according to an embodiment of the present invention. As shown, the system 100 includes: a storage unit 101, a processing unit 102, a selecting unit 103, an optimization unit 104, a verification unit 105, and a monitoring unit 106.

The storage unit 101 has a database of contents classified in different categories, the contents may be data/contents stored in the storage unit or it may be links to data/contents stored on the internet or clouds. In this embodiment, ChatGPT-based search engine is used as an example, and thus data is retrieved from data centers of a search engine such as Google, Bing, Yahoo, etc. In this case, data is not stored in the storage unit 101 but links to these data are stored in the database of the storage unit 101 and is classified in different categories.

The processing unit 102 is in charge of analyzing input data received from a user, determining search intent and sentiment of the user based on the input data, and identifying critical keywords and phrases related to a specific category of users and/or context, details would be later on further described. The processing unit 102 also predicts interest and/or preference of the user based on demographic data and/or social media interactions. The search intent, sentiment, critical keywords and phrases are determined and identified using natural language processing techniques and machine learning algorithms.

The selecting unit 103 is connected to the storage unit 101 and the processing unit 102. The selecting unit 103 selects content relevant to the search intent and sentiment of the user from the database in the storage unit 101 after the search intent and sentiment of the user is determined by the processing unit 102. The selected content can also be relevant to the predicted interest and/or preference of the user or can be based on search history of the user.

The optimization unit 104 is connected to the selecting unit 103. Once content is selected by the selecting unit 103, the optimization unit 104 further incorporates the identified critical keywords and phrases identified by the processing unit 102 into the selected content to generate an optimized content tailored to the user and context. The optimized content is based on the search intent, personal profile, and contextual information. The personal profile can be obtained via chat logs, weblogs, social media, and surveys. The optimization unit 104 also revises the selected content by using positive language and addressing common pain points and objections.

The verification unit 105 is connected to the optimization unit 104, for providing the optimized content to the natural language interaction application 200 to verify whether the optimized content is aimed at the specific category of users by the natural language interaction application 200, and updating the classification of the optimized content in the database according to the verification result.

The monitoring unit 106 monitors the search engine ranking of the optimized content and sends feedback to the processing unit 102 to adjust the optimization strategy accordingly. The monitoring unit 106 also tracks user behavior and sends feedback to the processing unit 102 to improve the search results and overall user experience.

It should be understood that devices that are in communication with each other need not be in continuous communication with each other, unless expressly specified otherwise. In addition, devices that are in communication with each other may communicate directly or indirectly through one or more intermediaries, logical or physical. A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. When a single device or article is described, it will be readily apparent that more than one device or article may be used in place of a single device or article. Similarly, where more than one device or article is described, it will be readily apparent that a single device or article may be used in place of the more than one device or article.

Figure 2:
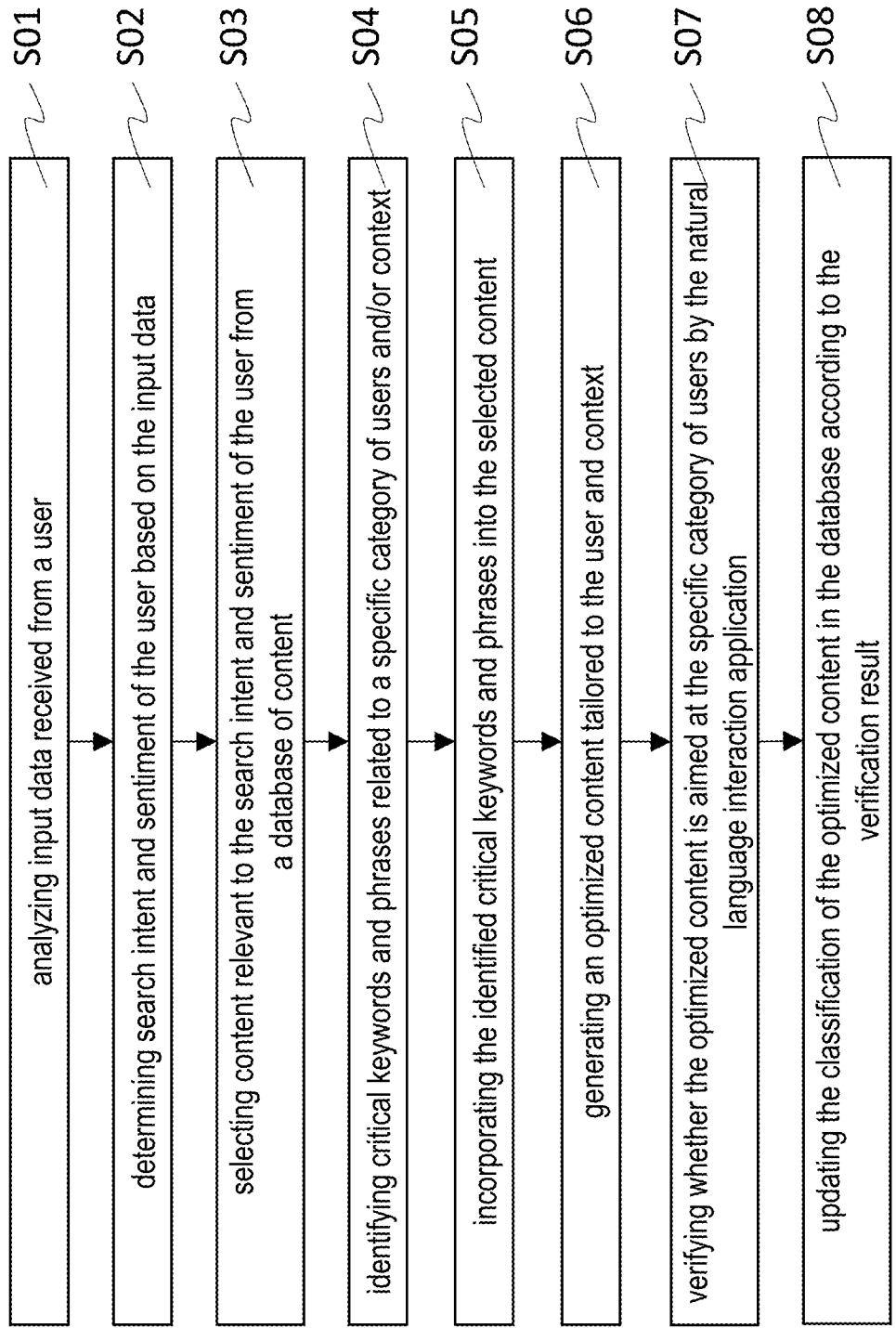
FIG. 2 is a flowchart illustrating a method for optimizing content to improve search results of a natural language interaction application according to an embodiment of the present invention.
Figure 3:
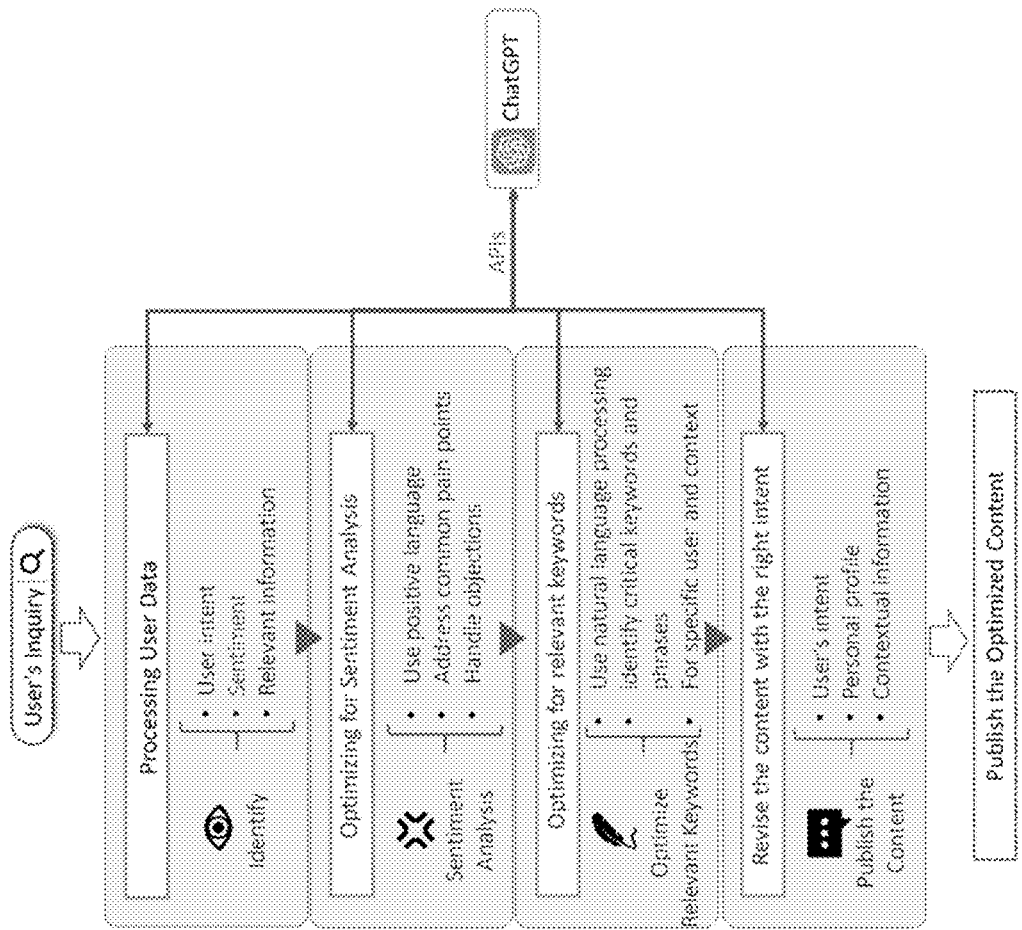
FIG. 3 is a conceptual overview of the method according to an embodiment of the present invention.
Figure 4:
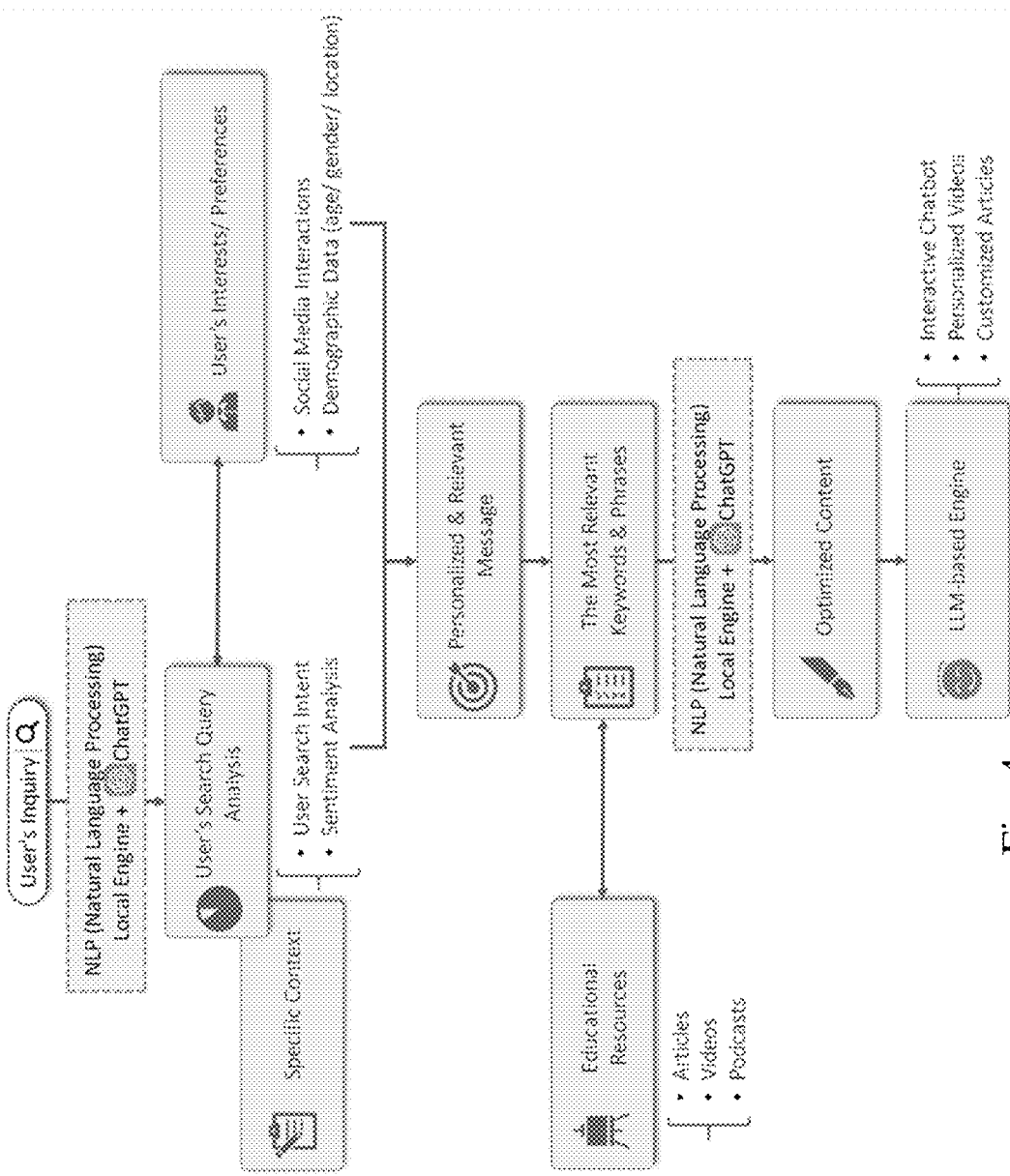
FIG. 4 is another conceptual overview of the method according to an embodiment of the present invention.

For a better understanding of the present invention, please refer to FIG. 2 which is a flowchart illustrating a method for optimizing content to improve search results of a natural language interaction application according to an embodiment of the present invention, and FIGS. 3 and 4 which provides conceptual overviews of the method.

User input or user request is provided to a natural language interaction application 200, which attempts to interpret the intention of the user request and construct one or more appropriate responses to the user request and provides any resulting responses to user queries (or, analogously, responses or reactions to requests) using those constructed responses. Requests to the natural language interaction application 200 may be made using any of a number of user interface means known in the art, including but not limited to use of text-based requests (for instance, generated by typing a question or command into a text entry field in a user interface, such as on a mobile device application, on a consumer device, on a web site, or in an email or other message), spoken requests (for example, if a user speaks a command or a question into a microphone on a mobile device or consumer device, the command or question then being converted into a more computer-usable form-typically but not necessarily a text string that comprises either a full transcription of the spoken command or request, or a standardized text element that is substantially semantically related to the spoken command or request), or even haptic or other user interface means (for instance, taking actions such as pressing a button on a mobile device, or shaking or orienting a mobile device in a specific way, or similar actions).

First, at step S01, once a user input or request is received from a user, the processing unit 102 analyzes the user input or request. Next, at step S02, the processing unit 102 determines search intent and sentiment of the user based on the user input or request. Then, at step S03, the selecting unit 103 selects content relevant to the search intent and sentiment of the user from the database in the storage unit 101 after the search intent and sentiment of the user is determined by the processing unit 102. The selected content can also be relevant to the predicted interest and/or preference of the user or can be based on search history of the user by further including a step of: predicting interest and/or preference of the user based on demographic data and/or social media interactions by the processing unit 102.

At step S04, identification of critical keywords and phrases related to a specific category of users and/or context is performed by the the processing unit 102. Then, at step S05, the identified critical keywords and phrases are incorporated into the selected content and an optimized content tailored to the user and context is generated, at step S06. In order to increase the chances of the optimized content to be cited by the natural language interaction application 200, may further include a step of: revising the selected content by using positive language and addressing common pain points and objections.

At step S07, the verification unit 105 provides the optimized content to the natural language interaction application 200 to verify whether the optimized content is aimed at the specific category of users by the natural language interaction application 200. If the optimized content is confirmed to be aimed at the specific category of users by the natural language interaction application 200 as desired, then the classification in the database of the storage unit 101 remains as is. If the optimized content aims at a different category of users by the natural language interaction application 200, then the classification of the optimized content in the database would be updated accordingly, at step S08.

According to the present invention, the method may further include the following two steps: monitoring the search engine ranking of the optimized content and adjusting the optimization strategy accordingly, and tracking user behavior and feedback to improve the search results and overall user experience.

The present invention provides a unique approach to optimizing content for natural language interaction applications 200 such as ChatGPT-based search engines, taking into account the unique characteristics of these search engines and how they differ from traditional search engines. The system and method can also involve several steps to match educational resources to the chatbot and search engine and optimize the content for better compatibility.

Figure 5:
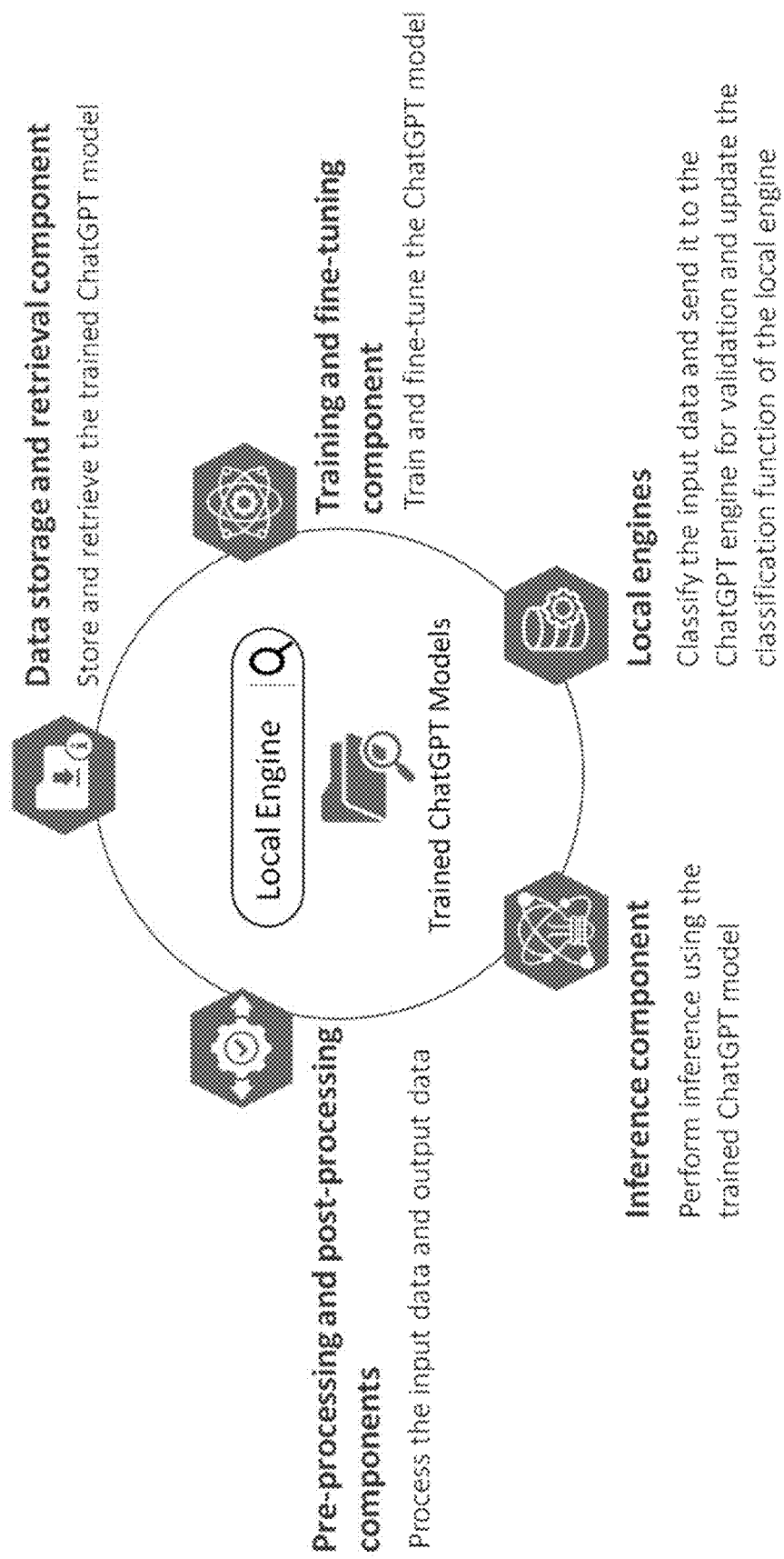
FIG. 5 is a conceptual diagram of the system according to an embodiment of the present invention.

FIG. 5 is a conceptual diagram of the system according to an embodiment of the present invention. The present invention provides a system that uses natural language processing (NLP) techniques to process user data and identify user intent, sentiment, and other relevant information by analyzing users' search queries and social media interactions to understand their interests and preferences. The system also collects and processes demographic data, including age, gender, and location, to provide a more personalized and relevant experience.

Once the user data has been processed, the system optimizes the content for better compatibility with ChatGPT-based search engines. This step involves optimizing the content for sentiment analysis by using positive language and addressing common pain points and objections. The system identifies the most relevant keywords and phrases for the user's context and optimizes the content using natural language processing techniques.

The system further uses dynamic response generation to improve the search results' relevance and accuracy to generate a dynamic response tailored to the user and context based on the user's intent, personal profile, and contextual information. The dynamic response can take various forms, such as an interactive chatbot, a personalized video, or a customized article.

To ensure the accuracy and relevance of the search results, the system uses a combination of local engines and ChatGPT. The local engines of the system will interact with ChatGPT to ensure the accuracy of their classification functions (sentiments, tone, etc.) can be validated and kept up to date.

The system relies on algorithms, software, and hardware to work. The system uses NLP algorithms to process the user data and optimize the content for better compatibility with ChatGPT-based search engines. The system also uses machine learning algorithms to improve the accuracy and relevance of the search results over time.

The system requires various software components, including a user interface for inputting user data and a search engine for returning relevant search results. The system also requires a ChatGPT engine for natural language processing, sentiment analysis, and local engines for classification function validation.

In terms of hardware, the system requires a computing device with sufficient processing power and memory to handle the NLP and machine learning algorithms. The computing device can be a desktop computer, a laptop, a tablet, or a smartphone.

The input data required for the system includes user data, such as search queries, social media interactions, and demographic data. The system also requires access to educational resources, such as articles, videos, and podcasts, to match the user's search queries.

The system's output data includes relevant search results, dynamic responses, and personalized educational resources. The system outputs the relevant search results based on the user's search queries and the optimized content. The dynamic responses and personalized educational resources are generated based on the user's intent, personal profile, and contextual information.

It is to be understood that the specific order or hierarchy of steps in the methods disclosed is an illustration of exemplary processes and may be rearranged based upon design preferences. The accompanying method claims present elements of the various steps in a sample order, and are not meant to be limited to the specific order or hierarchy presented unless specifically recited therein.

Although embodiments have been described herein with respect to particular configurations and sequences of operations, it should be understood that alternative embodiments may add, omit, or change elements, operations and the like. Accordingly, the embodiments disclosed herein are meant to be examples and not limitations.

What is claimed is:

1. A method for optimizing content to improve search results of a natural language interaction application, comprising the following steps executed by a processing unit comprising a processor and memory storing instructions:

receiving a user input data from a user through a user interface;

obtaining a personal profile of the user and a contextual information associated with the user interaction;

analyzing, using the processing unit, the user input data, the personal profile, and the contextual information by applying natural language processing (NLP) techniques including at least one of intent recognition, tone detection, or sentiment classification to identify a specific category to which the user belongs;

determining, using the processing unit, the user's search intent and sentiment based on the user input data by applying sentiment analysis techniques including at least one of polarity detection, positive-language scoring, or emotion classification;

selecting, using the processing unit, content that is relevant to the determined search intent and sentiment of the user from a content database based on the specific category to which the user belongs, wherein the contents in the content database are classified into various categories according to different user types and/or context;

identifying, using the processing unit, keywords and phrases related to the specific category of users and/or context by extracting keywords and phrases from the content database using keyword extraction techniques including at least one of frequency-based analysis, TF-IDF weighting, or co-occurrence analysis;

generating, using the processing unit, a revised content tailored to the specific category of users and/or context by incorporating the identified keywords and phrases into the selected content and by applying at least one of positive-language revision, objection-handling revision, or dynamic response generation;

submitting, using the processing unit, the revised content to the natural language interaction application and requesting the natural language interaction application to indicate the category of users and/or context that the revised content is classified under by the natural language interaction application; and verifying, using the processing unit, whether the indicated category of users and/or context for the revised content matches the specific category identified by the processing unit, and if the indicated category and the specific category align, maintaining the classification of the revised content in the content database unchanged; or if the indicated category and the specific category do not align, updating the classification of the revised content in the content database to reflect the indicated category, thereby ensuring that the revised content is appropriately classified for provision to the specific category of users and/or context by the natural language interaction application in future interactions, wherein the search intent, sentiment, keywords and phrases are determined and identified using the NLP techniques and machine learning algorithms including classifiers, keyword extractors, and sequence-to-sequence models executed by the processing unit.

2. The method according to claim 1, further comprising a step of: predicting interest and/or preference of the user based on demographic data and/or social media interactions.

3. The method according to claim 2, wherein the selected content is relevant to the predicted interest and/or preference of the user.

4. The method according to claim 1, wherein the selected content is based on search history of the user.

5. The method according to claim 1, further comprising a step of: revising the selected content by addressing common pain points and objections.

6. The method according to claim 1, wherein the revised content is based on the search intent, the personal profile of the user, and the contextual information of the user input data.

7. The method according to claim 6, wherein the personal profile is obtained via chat logs, weblogs, social media, and surveys.

8. The method according to claim 1, further comprising a step of: monitoring the search engine ranking of the revised content and adjusting the optimization strategy accordingly.

9. The method according to claim 1, further comprising a step of: tracking user behavior and feedback to improve the search results and overall user experience.

10. A computer-implemented system for optimizing content to improve search results of a natural language interaction application, comprising:

a user interface, configured to receive a user input data from a user;

a storage unit, configured to store a content database, wherein contents in the content database are classified into various categories according to different user types and/or context;

a processing unit, comprising a processor and memory storing instructions, the processing unit configured to: execute natural language processing (NLP) techniques and machine learning algorithms, obtain a personal profile of the user and contextual information associated with the user interaction, analyze the user input data, the personal profile, and the contextual information by applying NLP techniques including at least one of intent recognition, tone detection, or sentiment classification to identify a specific category to which the user belongs, determine the user's search intent and sentiment based on the user input data by applying sentiment analysis techniques including at least one of polarity detection, positive-language scoring, or emotion classification, and identify keywords and phrases related to the specific category of users and/or context y extracting keywords and phrases from the content database using keyword extraction techniques including at least one of frequency-based analysis, TF-IDF weighting, or co-occurrence analysis, wherein the search intent, sentiment, keywords, and phrases are determined and identified using the NLP techniques and machine learning algorithms including classifiers, keyword extractors, and sequence-to-sequence models executed by the processing unit;

a selecting unit, connected to the storage unit and the processing unit, configured to select content that is relevant to the determined search intent and sentiment of the user from the content database in the storage unit based on the specific category to which the user belongs;

an optimization unit, connected to the selecting unit, configured to generate a revised content tailored to the specific category of users and/or context by incorporating the identified keywords and phrases into the selected content and by applying at least one of positive-language revision, objection-handling revision, or dynamic response generation; and a verification unit, connected to the optimization unit, the verification unit configured to: submit the revised content to the natural language interaction application and request the natural language interaction application to indicate the category of users and/or context that the revised content is classified under by the natural language interaction application, verify whether the indicated category of users and/or context for the revised content matches the specific category identified by the processing unit, and, based on the verification, either maintain the classification of the revised content in the content database unchanged if the indicated category and the specific category align, or update the classification of the revised content in the content database to reflect the indicated category if the indicated category and the specific category do not align, thereby ensuring that the revised content is appropriately classified for provision to the specific category of users and/or context by the natural language interaction application in future interactions, wherein the selecting unit, the optimization unit, and the verification unit are implemented as software modules executable on one or more processors.

11. The computer-implemented system according to claim 10, wherein the processing unit further predicts interest and/or preference of the user based on demographic data and/or social media interactions.

12. The computer-implemented system according to claim 11, wherein the selected content is relevant to the predicted interest and/or preference of the user.

13. The computer-implemented system according to claim 10, wherein the selected content is based on search history of the user.

14. The computer-implemented system according to claim 10, wherein the selected content is revised by the optimization unit by addressing common pain points and objections.

15. The computer-implemented system according to claim 10, wherein the revised content is based on the search intent, a personal profile of the user, and a contextual information of the user input data.

16. The computer-implemented system according to claim 15, wherein the personal profile is obtained via chat logs, weblogs, social media, and surveys.

17. The computer-implemented system according to claim 10, further comprising a monitoring unit, for monitoring the search engine ranking of the revised content and sending feedback to the processing unit to adjust the optimization strategy accordingly.

18. The computer-implemented system according to claim 17, wherein the monitoring unit tracks user behavior and sends feedback to the processing unit to improve the search results and overall user experience.

\* \* \* \* \*